June 14, 1927. 1,632,024
R. L. DENNISON
FLUID PRESSURE REGULATOR
Original Filed Aug. 4, 1925  2 Sheets-Sheet 2
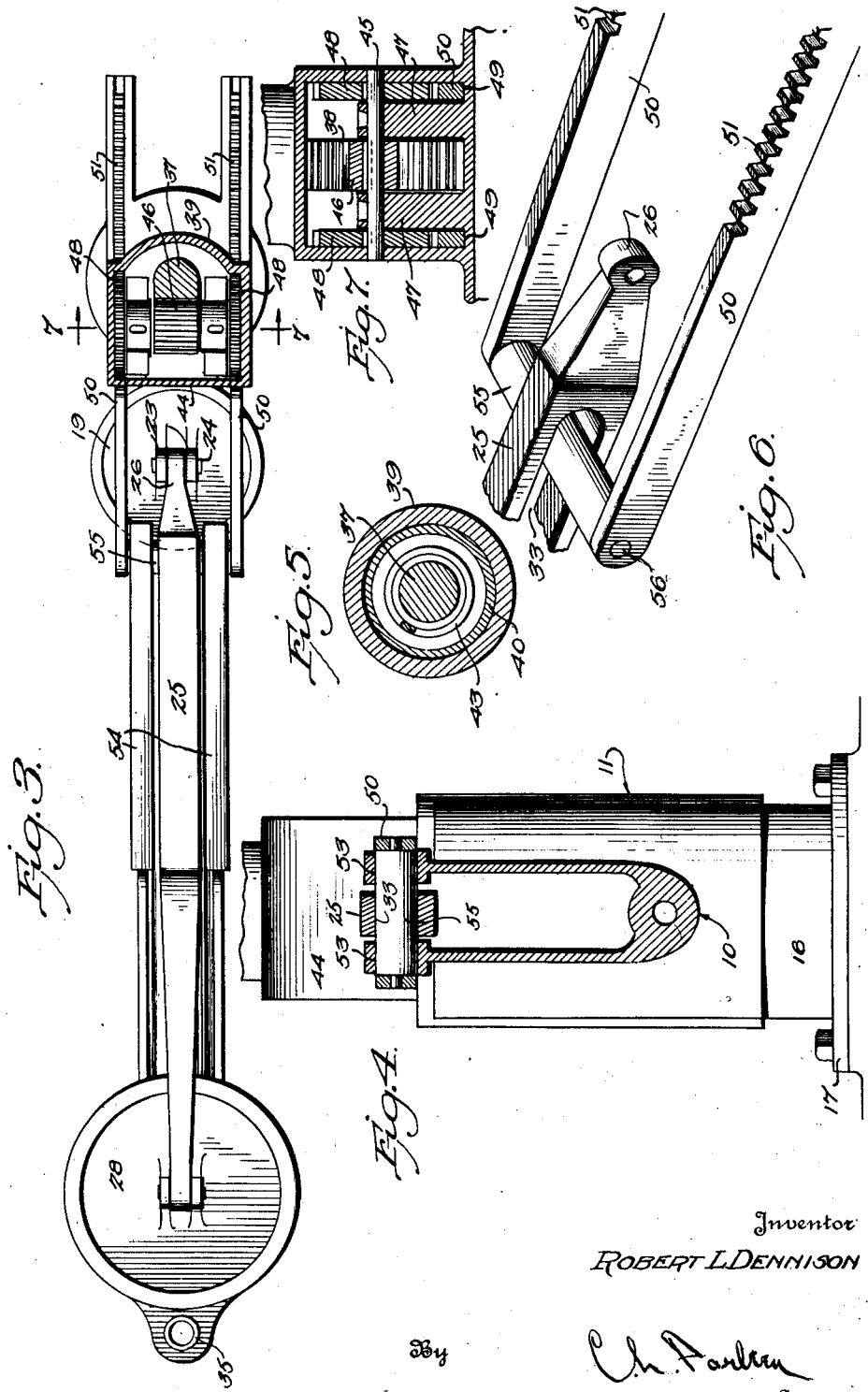
Inventor
ROBERT L. DENNISON
By
Attorney Patented June 14, 1927.

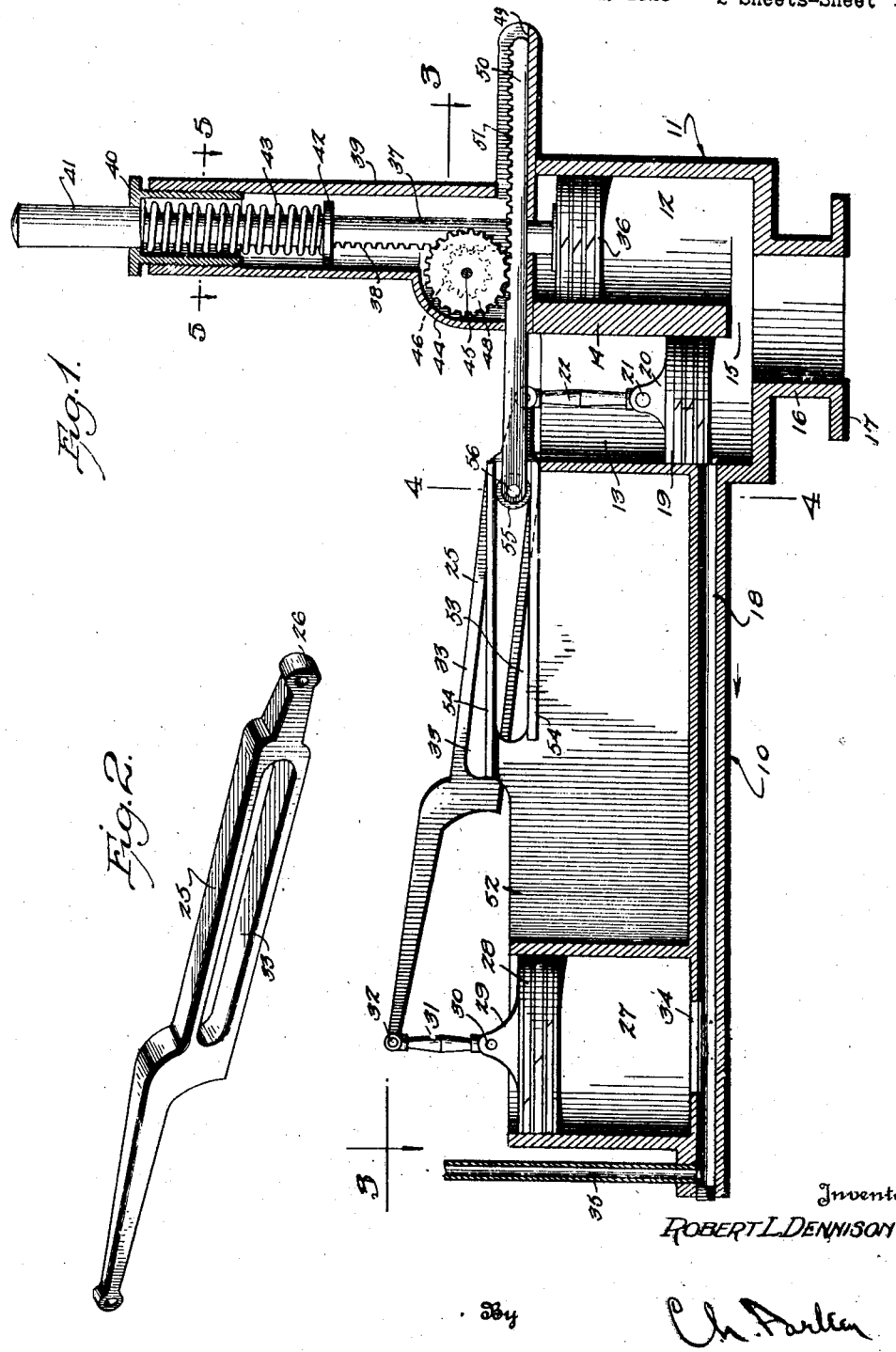

1,632,024

UNITED STATES PATENT OFFICE.

ROBERT L. DENNISON, OF NEW YORK, N. Y.

FLUID-PRESSURE REGULATOR.

Application filed August 4, 1925, Serial No. 48,155. Renewed November 15, 1926.

This invention relates to fluid pressure regulators and more particularly to a device adapted for controlling the passage of fluid pressure from a source to deliver fluid at a constant pressure.

In my copending application Serial No. 757,547 filed Dec. 22, 1924, I have shown a system for forming fuel charges for internal combustion engines wherein I employ a substantially U-shaped tank for containing liquid fuel, and in one side of the tank there is arranged a perforated pipe adapted to supply air under relatively slight pressure near the bottom of the tank, whereby the air will flow upwardly through the liquid fuel in one side of the tank in the form of bubbles to vaporize the fuel. The air passing from the fuel at the upper end of the tank will contain gasified fuel to which may be added sufficient air to properly support combustion in the internal combustion engine to which the apparatus is applied. In the charge forming device referred to it is desired to supply the gasified fuel in a constant degree of richness and in order to accomplish this result it is necessary that the column of fuel be maintained at a given height and that the air be supplied to the perforated pipe at a given constant pressure. In my copending application I disclose means for maintaining the liquid column at a given height and in the present application I have shown and described a device for supplying the air to the charge forming device at a constant given pressure.

An important object of the present invention is to provide a device adapted to be supplied with fluid pressure from a source such as a storage tank to control the passage of the fluid in such a manner that fluid will be delivered from the device at a reduced constant pressure.

An important object of the invention is to provide a device of the above mentioned character which may be connected to a source of variable pressure to deliver pressure fluid at a given reduced pressure adapted for use for any suitable purpose.

A further object is to provide a device having an inlet end connected to a source of variable fluid pressure and an outlet end connected to a device adapted for using fluid pressure from the source, a pressure responsive member being associated with the device to be controlled by the pressure adjacent the outlet end for governing the admission of fluid to the inlet end.

A still further object is to provide a device of the character just described wherein the means for controlling the admission of fluid pressure to the device comprises a valve connected by a lever to the pressure responsive device, the lever being supported intermediate its ends by a floating or movable fulcrum pin which is adapted to be automatically shifted to change the lever lengths according to the pressure of the fluid at the source.

Other objects and advantages of the invention will become apparent during the course of the following description.

In the drawings I have shown one embodiment of the invention. In this showing:

Figure 1 is a central vertical sectional view through the device, parts being shown in elevation, Figure 2 is a perspective of the control lever, Figure 3 is a section on line 3—3 of Figure 1, Figure 4 is a similar view on line 4—4 of Figure 1, Figure 5 is a similar view on line 5—5 of Figure 1, Figure 6 is a fragmentary perspective view of the floating fulcrum pin and associated elements, and, Figure 7 is a section on line 7—7 of Figure 3.

Referring to the drawings the numeral 10 designates a preferably integral casting as a whole provided at one end with an enlargement 11 which contains a pair of cylinders 12 and 13. These cylinders are divided by a central wall 14 and communicate with each other through a passage 15 at the lower end of the wall. The enlarged end of the casting is provided substantially centrally thereof with a depending pipe 16 communicating with both of the cylinders and provided at its lower end with a flange 17 by means of which it may be secured to a pressure tank to be supplied with fluid therefrom. A preferably integral outlet passage 18 communicates with the cylinder 13 as shown in Figure 1 and extends toward the opposite end of the casting.

A piston 19 is mounted to reciprocate within the cylinder 13 as shown. This piston is normally arranged above the passage 18 and is provided at its upper end with ears 20 to which is pivotally connected as at 21 a vertically extending link 22. The link 22 is provided at its upper end with a pair of ears 23 receiving a pivot pin 24. A lever 25 is arranged with one end 26 between the ears 23 and the pin 24 passes through the end 26 to pivotally connect the lever to the ears as will be obvious.

At the opposite end of the casting there is provided a cylinder 27 in which is arranged a vertically movable piston 28. This piston is provided on its upper face with ears 29 to which is pivotally connected as at 30 a link 31. The upper end of this link is pivotally connected as at 32 with the opposite end of the lever 25. The lever is provided with an elongated slot 33 for a purpose to be described. The passage 18 and cylinder 27 are adapted to communicate through an opening 34 as shown in Figure 1. The passage 18 extends beyond the cylinder 27 and communicates with an outlet pipe 35.

A piston 36 is mounted to reciprocate within the cylinder 12 as shown in Figure 1 and this piston is connected to an upwardly extending piston rod 37 provided on one side with a rack 38. A substantially tubular head 39 is arranged over the cylinder 12 and may be secured thereto in any suitable manner. The upper end of the tubular head 39 is provided with an adjusting nut 40 in which is slidably arranged a plunger 41 which is secured to the rod 37. A collar 42 is secured to the rod 37 at a point spaced from the plunger 41, and a coil spring 43 surrounds the rod 37 between the collar 42 and the nut 40. It will be obvious that rotation of the nut 40 will adjust the tension of the spring 43.

The head 39 is provided near its lower end with an arcuate enlargement 44 in which is mounted a shaft 45. A relatively small pinion 46 is secured to the shaft 45 to rotate therewith and this pin meshes with the rack 38 as shown in Figures 1 and 3. The shaft 45 may be supported on opposite sides of the pinion 46 by bearings 47 and the shaft may extend through the opposite walls of the head 39, as shown in Figure 7. Outwardly of the bearings 47, the shaft is provided with a pair of gears 48 which are secured to the shaft and adapted to rotate therewith. Guides 49, preferably formed integral with the head, are arranged parallel to each other and below the gears 48. Rods 50 are mounted to reciprocate within the guides and these rods are provided at their upper edges with racks 51 meshing with the gears 48.

The casting 10 is provided with parallel webs 52 preferably formed integral therewith and these webs are provided adjacent their upper edges with spaced parallel longitudinal slots 53 as shown in Figures 1 and 4. The webs are further provided on opposite sides of each slot with slide bearings 54. A fulcrum pin 55 extends through the slots 53 and is provided at its ends with reduced studs 56 arranged in openings formed in the inner ends of the bars 50. As shown in Figures 4 and 6, the fulcrum pin also extends through the slot 33 formed in the lever 25.

The operation of the device is as follows: The flange 17 is connected to a suitable storage tank containing a fluid under pressure and the outlet pipe 35 is connected to any suitable device to which compressed air at a given constant pressure is to be supplied, such as the charge forming device shown in my copending application previously mentioned. The storage tank may be supplied with air or other fluid by means of any suitable form of pump which may be controlled automatically in any of the usual ways for maintaining pressures between a fixed minimum and maximum. Obviously the pressure in the tank will vary within the minimum and maximum which ordinarily would affect the pressure of the fluid passing through the pipe 35 if an ordinary reduction valve were employed. In the present device the fluid passing from the lower end of the cylinder 13 to the passage 18 will be controlled by the piston valve 19. As previously stated, the cylinder 27 communicates with the passage 18 and accordingly the piston 28 therein will be influenced by the pressure in the passage 18. If this pressure increases it will be obvious that the piston 28 will be moved upwardly thus moving the opposite end of the lever 25 downwardly and causing the piston 19 to partially or wholly close the inlet end of the passage 18. It will be obvious that upward movement of the piston 28 must overcome the pressure of the fluid in the lower end of the cylinder 13 and accordingly the effect of the piston 28 will vary in accordance with variations of pressure in the storage tank. I therefore provide means for varying the position of the fulcrum pin 55 to change the effective lever arms of the lever 25 according to the pressure in the storage tank. Pressure in the tank will be communicated to the cylinder 12 below the piston 36 and will influence the movement of the latter. As the pressure in the tank increases toward its maximum the piston 36 will be moved upwardly and the rack 38 will rotate the pinion 46. This action in turn rotates the gears 48 which retract the bars 50 thus moving the fulcrum pin 55 nearer the inner end of the lever 25, as will be obvious. This action shortens the lever arm adjacent the piston 19 and lengthens the lever arm adjacent the piston 28. Thus it will be seen that the piston 28 will exert greater or less downward force upon the valve 19 according to the pressure against which the latter is forced to operate and accordingly a constant pressure may be maintained in the cylinder 27 and consequently in the passage 18 and pipe 35, so that a given constant pressure may be supplied to the charge forming device or other apparatus connected to the pipe 35. The pressure to be delivered may be varied by rotating the nut 40 to vary the tension on the spring 43. It will be obvious that upward movement of the piston 36 will be opposed by the tension of the spring 43 and consequently the greater the tension of this spring the greater will be the pressure necessary to place the fulcrum pin 55 in any given position.

It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. A pressure regulating device comprising a valve cylinder communicating with a source of variable fluid pressure, a conduit communicating at one end with said valve cylinder, a valve arranged in said cylinder and adapted to control passage of fluid therefrom to said conduit, a pressure cylinder communicating with said conduit, a piston mounted to reciprocate in said pressure cylinder, a lever pivotally connected at opposite ends to said piston and said valve, said lever being provided intermediate its ends with a longitudinal slot, a guide bearing, a fulcrum pin mounted in said bearing and projecting through said slot, a chamber communicating with said source, a member movable in said chamber in response to the pressure in said source, a rod carried by said movable member and provided with rack teeth, a pinion meshing with said rack, a second pinion connected to said first named pinion to rotate therewith, a slidable bar connected at one end to said fulcrum pin and provided with rack teeth meshing with said second pinion, and means yieldingly opposing movement of said movable member.

2. A device constructed in accordance with claim 1 wherein said last named means comprises a spring, and means for varying the tension of said spring.

3. A pressure regulating device comprising an integral body portion including a pressure chamber communicating with a source of variable fluid pressure, an expansion chamber spaced from said pressure chamber, and a conduit connecting said pressure chamber and said expansion chamber, a valve arranged in said pressure chamber and adapted to control communication through said conduit, a movable member arranged in said expansion chamber and responsive to variations in pressure therein, a lever connected at its ends to said movable member and said valve, a fulcrum pin passing through said lever intermediate its ends and projecting from opposite sides thereof, said fulcrum pin being movable longitudinally with respect to said lever, said body portion being provided on opposite sides of said lever with integral guides slidably receiving the projecting portions of said fulcrum pin, a pressure responsive member arranged in said pressure chamber and movable in one direction therein upon an increase in pressure in said source, connections between said last named member and said fulcrum pin, a spring normally opposing movement of the pressure responsive member in said pressure chamber, and means for varying the tension of said spring.

4. A pressure regulating device comprising a valve chamber communicating with a source of variable fluid pressure, a conduit connected at one end to said valve chamber, a valve in said chamber adapted to control passage of fluid therefrom to said conduit, a member spaced a substantial distance from said valve chamber and directly responsive to pressure in said conduit, a lever connected between said member and said valve, a fulcrum pin passing through said lever, and means responsive to pressure from said source for shifting said fulcrum pin longitudinally with respect to said lever.

5. A pressure regulating device comprising a valve chamber communicating with a source of variable fluid pressure, a conduit communicating at one end with said valve chamber, a valve in said chamber adapted to control passage of fluid therefrom to said conduit, a member spaced a substantial distance from said valve chamber and directly responsive to pressure in said conduit, a lever connected between said pressure responsive member and said valve and provided with a longitudinal slot, a slide bearing, a fulcrum pin slidable in said bearing and passing through said slot, and means for moving said fulcrum pin nearer to said valve as the pressure in said source increases.

6. A device constructed in accordance with claim 5 wherein the means for moving said fulcrum pin comprises a cylinder communicating with said source, a piston arranged in said cylinder, means yieldingly opposing movement of said piston, and connections between said piston and said fulcrum pin.

In testimony whereof I affix my signature.

ROBERT L. DENNISON.